United States Patent [19]
Kakuske

[11] Patent Number: 5,395,141
[45] Date of Patent: Mar. 7, 1995

[54] SWIVEL COUPLING DEVICE

[76] Inventor: James P. Kakuske, 7233 W. Butler Rd., Janesville, Wis. 53545

[21] Appl. No.: 169,064

[22] Filed: Dec. 20, 1993

[51] Int. Cl.$^6$ ............................................. F16L 27/08
[52] U.S. Cl. ..................................... 285/281; 285/61; 285/175; 285/351; 285/381
[58] Field of Search ................ 285/281, 381, 276, 98, 285/305, 351, 175, 61

[56] References Cited

U.S. PATENT DOCUMENTS

| | | | |
|---|---|---|---|
| 2,305,725 | 12/1942 | Meyer | 285/281 |
| 2,632,659 | 3/1953 | Lee | 285/281 X |
| 3,266,821 | 8/1966 | Sofford | 285/381 X |
| 4,229,024 | 10/1980 | Oberrecht | 285/281 X |

FOREIGN PATENT DOCUMENTS 883498  11/1961  United Kingdom ................ 285/281

*Primary Examiner*—Dave W. Arola
*Attorney, Agent, or Firm*—David J. Archer

[57] ABSTRACT

A swivel coupling device is disclosed which includes a first portion having a first and a second end. The first portion includes a tubular extension which defines a cylindrical outer surface having an annular recess therein. An O-ring co-operates with and is partially disposed within the recess. A hexagon member is disposed between the extension and the second end of the first portion for selectively inhibiting rotational movement of the first portion. A collar is disposed between the recess and the hexagonal member. The collar and the hexagonal member define therebetween an annular groove. An open sided washer co-operates with the annular groove. A second portion has a first and a second extremity and defines a bore and a counter bore. The bore extends from the first extremity to the counter bore and the counter bore extends from the bore to the second extremity. A cylindrical insert is disposed within the counter bore. The insert defines a conduit which slidingly receives therein the tubular extension such that the O-ring slidingly engages the conduit. A flange extends from the second extremity and the second portion and a fastener fastens the washer to the flange. The arrangement is such that when the extension is slidingly received within the conduit, and when the washer is disposed within the groove, the fastener fastens the washer to the flange so that relative rotation between the first and the second portion is permitted.

19 Claims, 1 Drawing Sheet

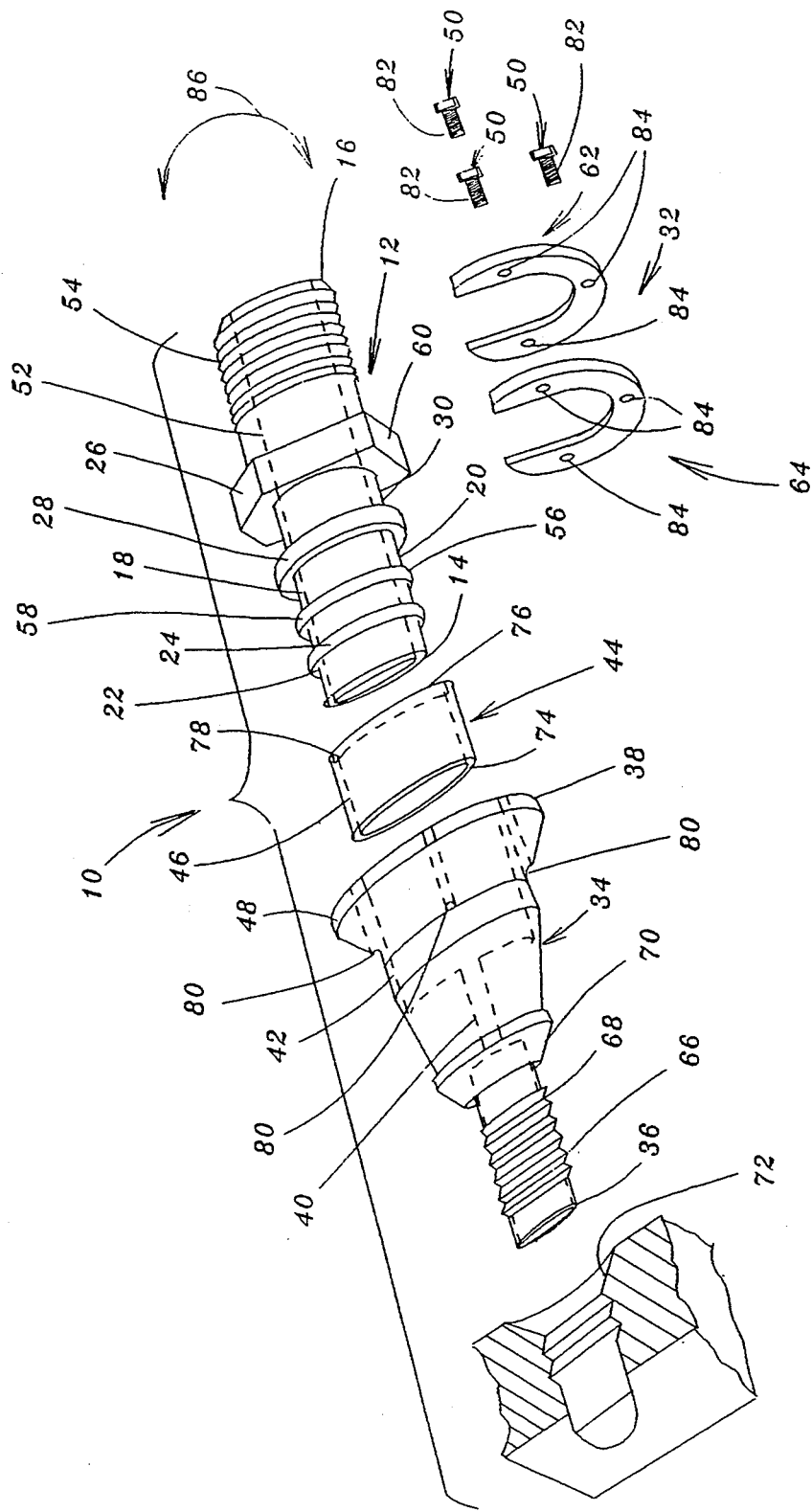

SWIVEL COUPLING DEVICE

BACKGROUND OF THE INVENTION

1. Field of the Invention

The present invention relates to a swivel coupling device. More particularly, the present invention relates to a swivel coupling device having a first and a second portion sealingly connected to each other for permitting the flow therethrough of a fluid, while permitting relative rotational movement between the portions.

2. Background Art

In the automobile industry for example, many of the manufacturing procedures are accomplished by the use of robotic equipment. Such procedures include welding and spraying various components of the automobile.

With regard to robotic spraying equipment, it is not uncommon to have several supply conduits for supplying various sprayable compounds to a corresponding number of robotic spray heads.

Usually, such supply conduits are rigidly secured to apertures within a frame and flexible supply lines are connected to the supply conduit for conducting the sprayable compound to the robotic spray head.

Although such flexible lines permit a degree of freedom of movement of the robotic spray head, such an arrangement does not permit complete freedom of movement of the spray head relative to the supply conduit.

OBJECTS OF THE INVENTION

The present invention seeks to overcome the aforementioned problem by the provision of a swivel coupling which permits relative rotational movement between a supply conduit and a flexible supply line.

Also, the present invention completely isolates the sprayable compound from the metallic surfaces of the coupling device.

More specifically, the purpose of the present invention is the provision of a swivel coupling which permits rotation through 360 degrees and eliminates breakage of a plastic flow line carrying paint and/or thinner to a spray head on robotic painting equipment or any other painting process that would use similar equipment.

The present invention provides an internally sealed swivel coupling which is able to rotate through 360° while transporting fluid under high or low pressure without leakage.

A need has existed in the art for a swivel coupling which would be able to withstand the sharp and rapid movements of a paint spraying robot. Such movements have up till the present invention caused strain and breakage of the plastic line carrying paint and thinner from the rigidly mounted swivel coupling.

The present invention provides means that relieve the strain on the plastic line by the internal rotation of the device thereby eliminating breakage while maintaining the required spraying pressure.

Therefore, it is a primary objective of the present invention to provide a swivel coupling device which overcomes the aforementioned problems associated with prior art coupling devices and which makes a considerable contribution to the fluid coupling art.

Another object of the present invention is the provision of a swivel coupling device which permits relative rotational movement between a first and a second portion of the device while isolating the material being conveyed by the coupling device from the metallic internal components of the coupling device.

The functional ability of the device according to the present invention lies in the fact that the first portion rotates freely inside the second portion while being encased on all sides by a bearing material such as TEFLON or the like.

Other objects and advantages of the present invention will be readily apparent to those skilled in the art by a consideration of the detailed description contained hereinafter taken in conjunction with the annexed drawings.

SUMMARY OF THE INVENTION

The present invention relates to a swivel coupling device which comprises a first portion having a first and a second end. The first portion includes a tubular extension which defines a cylindrical outer surface having an annular recess therein.

An O-ring co-operates with and is partially disposed within the recess. Means are disposed between the extension and the second end of the first portion for selectively inhibiting rotational movement of the first portion.

A collar is disposed between the recess and the means with the collar and the means defining therebetween an annular groove. An open sided washer means co-operates with the annular groove.

A second portion has a first and a second extremity and the second portion defines a bore and a counter bore. The bore extends from the first extremity to the counter bore and the counter bore extends from the bore to second extremity.

A cylindrical insert is disposed within the counter bore. The insert defines a conduit which slidingly receives therein the tubular extension such that the O-ring slidingly engages the conduit.

A flange extends from the second extremity of the second portion and fastening means fastens the flange to the washer means. The arrangement is such that when the extension is slidingly received within the conduit, and when the washer means is disposed within the groove, the fastening means fastens the flange to the washer means so that relative rotation between the first and the second portions is permitted.

In a more specific embodiment of the present invention, the first portion defines a channel which extends from the first to the second end thereof.

Additionally, the first portion further includes an externally threaded portion which extends from the second end towards the means.

The first end is disposed adjacent to the bore when the first end is inserted into the conduit.

In a preferred embodiment of the present invention, the first and second portions are of stainless steel.

Additionally, the cylindrical outer surface also defines a further recess and the first portion further includes a second O-ring which co-operates with the further recess.

In the preferred embodiment of the present invention, the means is a hexagonal portion which is rigidly secured to and disposed integrally with the first portion.

The collar abuts against the insert when the extension is disposed within the insert.

Also, the washer means includes an open sided steel washer and a resilient open sided washer disposed between the steel washer and the flange. The resilient washer is of TEFLON.

TEFLON is a registered trademark of E.I. Du Pont de Nemours.

The second portion also includes a connecting member which is disposed adjacent to the first extremity with the member defining an external thread.

Also, the second portion further includes a conical shaped seating portion which is disposed between the connecting member and the second extremity for enabling the second portion to be seated relative to a supporting frame.

The insert forms an interference fit within the counter bore.

The insert is of TEFLON, the arrangement being such that the insert forms an inteference fit within the counter bore so that removal of the insert is facilitated by rapidly reducing the temperature of the second portion so that the TEFLON insert shrinks relative to the counter bore such that the insert may be removed from the counter bore.

The insert includes a first and a second side. The first side abuts against the counter bore adjacent to the bore and the second side defines a cup shaped depression for the reception therein of the collar.

The flange defines at least one hole for the reception therein of the fastening means.

Additionally, the fastening means includes at least one but preferably three threaded fasteners which co-operate with the flange and washer means for fastening together the flange and the washer means.

Many variations and modifications of the present invention will be readily apparent to those skilled in the art by a consideration of the detailed description contained hereinafter taken in conjunction with the annexed drawings. However, such modifications and variations fall within the spirit and scope of the present invention as defined by the appended claims.

Included in the aforementioned variations is an arrangement in which the first and second portions are of molded plastics material in which case no insert would be required. Such plastics materials would include for example LEXAN or the like. Alternatively, one or other of the portions or both of the portions could be of bronze.

Also, it will be appreciated by those skilled in the art that after extensive use of the device according to the present invention, installation of a new insert and O-rings will restore the device to its original condition.

BRIEF DESCRIPTION OF THE DRAWINGS

FIG. 1 is an exploded perspective view of a coupling device according to the present invention.

DETAILED DESCRIPTION OF THE DRAWINGS

FIG. 1 is a exploded perspective view of a swivel coupling device generally designated 10 according to the present invention.

The swivel coupling device 10 comprises a first portion 12 having a first and a second end 14 and 16 respectively. The first portion 12 includes a tubular extension 18 which defines a cylindrical outer surface 20 having an annular recess 22 therein.

An O-ring 24 co-operates with and is partially disposed within the recess 22.

Means 26 is disposed between the extension 18 and the second end 16 of the first portion 12 for selectively inhibiting rotational movement of the first portion 12.

A collar 28 is disposed between the recess 22 and the means 26. The collar 28 and the means 26 define therebetween an annular groove 30.

Open sided washer means generally designated 32 co-operate with the annular groove 30.

A second portion generally designated 34 has a first and a second extremity 36 and 38 respectively. The second portion 34 defines a bore 40 and a counter bore 42. The bore 40 extends from the first extremity 36 to the counter bore 42. The counter bore 42 extends from the bore 40 to the second extremity 38.

A cylindrical insert 44 is disposed within the counter bore 42. The insert 44 defines a conduit 46 which slidingly receives therein the tubular extension 18 such that the O-ring 24 slidingly engages the conduit 46.

A flange 48 extends from the second extremity 38 of the second portion 34.

Fastening means generally designated 50 fasten the washer 62 to the flange 48. The arrangement is such that when the extension 18 is slidingly received within the conduit 46, and when the washer means 32 including 62 and 64 are disposed within the groove 30, the fastening means 50 fastens the steel washer 62 and the TEFLON washer 64 to the flange 48 so that relative rotational movement between the first and second portions 12 and 34 respectively is permitted.

More specifically, the first portion 12 defines a channel 52 which extends from the first end 14 to the second end 16 of the first portion 12.

The first portion 12 also includes an externally threaded portion 54 which extends from the second end 16 towards the means 26.

The first end 14 is disposed adjacent to the bore 40 when the first end 14 is inserted into the conduit 46.

The first portion 12 and the second portion 34 are preferably fabricated from stainless steel.

Additionally, the cylindrical outer surface 20 also defines a further recess 56 and the first portion 12 also includes a second O-ring 58 which co-operates with the further recess 56. Preferably, the O-rings 24 and 58 are fabricated from KALREZ. KALREZ is a registered Trademark of E.I. Du Pont De Nemours. The means 26 as shown in FIG. 1 is a hexagonal portion 60 which is rigidly secured to and disposed integrally with the first portion 12. The arrangement is such that the hexagonal portion 60 is engagable with a wrench or the like for permitting the connection of the first portion 12 to a flexible lead (not shown).

The collar 28 abuts against the insert 44 when the extension 18 is disposed within the insert 44.

The washer means generally designated 32 also includes an open sided steel washer 62 preferably fabricated from stainless steel and a resilient open sided washer 64 disposed between the steel washer 62 and the flange 48.

The resilient washer 64 is fabricated from TEFLON.

The second portion 34 also includes a connecting member 66 which is disposed adjaced to the first extremity 36 of the second portion 34. The member 66 defines an external thread 68.

The second portion 34 also includes a conical shaped seating portion 70 which is disposed between the connecting member 66 and the second extremity 38 for enabling the second portion 34 to be seated relative to a supporting frame 72.

The insert 44 forms an interference fit with the counter bore 42.

The insert 44 is preferably fabricated from TEFLON the arrangement being such that the insert 44 forms an interference fit within the counter bore 42 so that removal is facillitated by rapidly reducing the temperature of the second portion 34 so that the TEFLON insert shrinks relative to the counter bore such that the insert 44 may be removed from the counter bore 42. However, it will be appreciated by those skilled in the art that materials other than TEFLON can be used for fabricating the insert.

The insert 44 has a first and a second side 74 and 76 respectively. The first side 74 abuts against the counter bore 42 adjacent to the bore 40. The second side 76 defines a cup shaped depression 78 for the reception therein of the collar 28.

The flange 48 defines at least one hole 80 for the reception therein of the fastening means 50.

The fastening means 50 includes at least one but preferably three threaded fasteners 82 which co-operate with the flange 48 and the washer means 32 for fastening together the flange 48 and the washer means 32. More specifically, the threaded fasteners 82 extend through the respective holes 84 in the steel washer and the TEFLON washer so that the threaded fasteners 82 are threaded into the corresponding holes 80 in the flange 48. The arrangement is such that the fasteners 82 slide through the holes 84 so that the stainless steel washer 62 is drawn towards the flange 48 thereby locking the first portion 12 within the second portion 34.

Additionally, each of the fasteners 82 preferably include a recess within the head thereof for the reception therein of an ALLEN key or the like.

Also, the holes 84 in the steel washer 62 are counterbored so that the heads of the fasteners are countersunk within the washer 62 so that the heads of the fasteners 82 do not strike the means 26 during rotation thereof.

Alternatively, the extension 18 may be longer and the groove 30 wider so that when the fasteners are inserted within the flange, the heads thereof do not strike the means 26.

In operation of the device 10 the first end 14 of the first portion 12 is inserted within the insert 44 disposed within the counter bore 42 so that the O-rings 24 and 58 form a seal relative to the conduit 46.

Next, the TEFLON washer 64 and the stainless steel washer 62 are moved sideways to engage the annular groove 30. The threaded fasteners 82 are then inserted through the corresponding holes in the stainless steel washer and TEFLON washer and then threaded into the threaded holes 80 of the flange 48. The arrangement is such that the stainless steel washer 62 is drawn towards the flange 48 for locking the first portion 12 relative to the second portion 34 while permitting relative rotational movement as indicated by the arrow 86 between the first portion 12 and the second portion 34.

The present invention provides a simple and reliable means for providing a fluid tight coupling between a supply conduit and a flexible or solid lead while preventing contact between the fluid being conveyed through the coupling device and the metallic inner surface of the coupling device.

What is claimed is:

1. A swivel coupling device, said device comprising:
   a first portion having a first and a second end;
   said first portion including:
   a tubular extension defining a cylindrical outer surface having an annular recess therein;
   an O-ring co-operating with and partially disposed within said recess;
   means disposed between said extension and said second end of said first portion for selectively inhibiting rotational movement of said first portion;
   a collar disposed between said recess and said means, said collar and said means defining therebetween an annular groove;
   open sided washer means transversely mounted in and co-operating with said annular groove for limiting axial movement of said first portion relative to said washer means;
   a second portion having a first and a second extremity, said second portion defining a bore and a counterbore, said bore extending from said first extremity to said counterbore, said counterbore extending from said bore to said second extremity;
   a cylindrical insert disposed within said counterbore, said insert defining a conduit which slidingly receives therein said tubular extension such that said O-ring slidingly engages said conduit;
   a flange extending from said second extremity of said second portion; and
   fastening means for fastening said flange to said washer means, the arrangement being such that when said extension is slidingly received within said conduit, and when said washer means is disposed within said groove, said fastening means fastens said flange to said washer means so that relative rotation between said first and second portions is permitted.

2. A coupling device as set forth in claim 1 wherein said first portion defines a channel which extends from said first to said second end thereof.

3. A coupling device as set forth in claim 1 wherein said first portion further includes:
   an externally threaded portion which extends from said second end towards said means.

4. A coupling device as set forth in claim 1 wherein said first end is disposed adjacent to said bore when said first end is inserted into said conduit.

5. A coupling device as set forth in claim 1 wherein said first portion is of stainless steel.

6. A coupling device as set forth in claim 1 wherein said cylindrical outer surface defines a further recess, said first portion further including:
   a second O-ring which co-operates with said further recess.

7. A coupling device as set forth in claim 1 wherein said means is a hexagonal portion rigidly secured to and disposed integrally with said first portion.

8. A coupling device as set forth in claim 1 wherein said collar abuts against said insert when said extension is disposed within said insert.

9. A coupling device as seet forth in claim 1 wherein said washer means includes:
   an open sided steel washer;
   a resilient open sided washer disposed between said steel washer and said flange.

10. A coupling device as set forth in claim 1 wherein said resilient washer is of TEFLON.

11. A coupling device as set forth in claim 1 wherein said second portion further includes:
    a connecting member disposed adjacent to said first extremity, said member defining an external thread.

12. A coupling device as set forth in claim 11 wherein said second portion further includes:

a conical shaped seating portion disposed between said connecting member and said second extremity for enabling said second portion to be seated relative to a supporting frame.

13. A coupling device as set forth in claim 1 wherein said insert forms an interference fit within said counterbore.

14. A coupling device as set forth in claim 1 wherein said insert is of TEFLON, the arrangement being such that said insert forms an interference fit within said counterbore so that removal of said insert is facilitated by rapidly reducing the temperature of said second portion so that said TEFLON insert shrinks relative to said counterbore such that said insert may be removed from said counterbore.

15. A coupling device as set forth in claim 1 wherein said insert has a first and a second side, said first side abutting against said counterbore adjacent to said bore, said second side defining a cup shaped depression for the reception therein of said collar.

16. A coupling device as set forth in claim 1 wherein said flange defines at least one hole for the reception therein of said fastening means.

17. A coupling device as set forth in claim 1 wherein said fastening means includes:
at least one threaded fastener which co-operates with said flange and said washer means for fastening together said flange and said washer means.

18. A swivel coupling device, said device comprising:
a first portion having a first and a second end;
said first portion including:
a tubular extension defining a cylindrical outer surface having an annular recess therein;
an O-ring co-operating with and partially disposed within said recess;
means disposed between said extension and said second end of said first portion for selectively inhibiting rotational movement of said first portion;
a collar disposed between said recess and said means, said collar and said means defining therebetween an annular groove;
open sided washer means transversely mounted in and co-operating with said annular groove for limiting axial movement of said first portion relative to said washer means;
a second portion having a first and a second extremity, said second portion defining a bore and a counterbore, said bore extending from said first extremity to said counterbore, said counterbore extending from said bore to said second extremity;
a flange extending from said second extremity of said second portion; and
fastening means for fastening said flange to said washer means, the arrangement being such that when said extension is slidingly received within said counterbore, and when said washer means is disposed within said groove, said fastening means fastens said flange to said washer means so that relative rotation between said first and second portions is permitted.

19. A coupling device as set forth in claim 18 wherein said portions are fabricated from plastics materials.

* * * * *